US007286249B2

(12) United States Patent
Engel

(10) Patent No.: US 7,286,249 B2
(45) Date of Patent: Oct. 23, 2007

(54) PRINTER OR OTHER AUTOMATIC PRINTING SYSTEM WITH ADDITIONAL CONTROL DEVICE AND CONTROL DEVICE THEREFOR

(75) Inventor: Stefan Engel, Rückersdorf (DE)

(73) Assignee: J.S. Staedtler GmbH & Co., Nürnberg (DE)

( * ) Notice: Subject to any disclaimer, the term of this patent is extended or adjusted under 35 U.S.C. 154(b) by 906 days.

(21) Appl. No.: 10/350,413

(22) Filed: Jan. 24, 2003

(65) Prior Publication Data

US 2003/0142341 A1 Jul. 31, 2003

(30) Foreign Application Priority Data

Jan. 31, 2002 (DE) ................................ 102 04 229

(51) Int. Cl.
*G06F 15/00* (2006.01)
*G06F 3/12* (2006.01)

(52) U.S. Cl. ....................................... 358/1.14; 358/1.8

(58) Field of Classification Search ................. 358/1.1, 358/1.8, 1.9, 1.14, 1.15; 347/19, 20, 59, 347/81, 84, 95; 399/111
See application file for complete search history.

(56) References Cited

U.S. PATENT DOCUMENTS

| | | | | |
|---|---|---|---|---|
| 6,532,351 | B2 * | 3/2003 | Richards et al. | 399/111 |
| 2004/0093372 | A1 * | 5/2004 | Chen et al. | 709/203 |

FOREIGN PATENT DOCUMENTS

| | | |
|---|---|---|
| DE | 199 56 702 A1 | 6/2000 |
| EP | 1080912 | 2/2001 |

OTHER PUBLICATIONS http://news.com.com/Hackers+break+Dreamcast+safeguards%2C+distribute+games+online/2100-1023_3-242686.html.*
http://en.wikipedia.org/wiki/Modchip.*
http://www.technologyreview.com/read_article.aspx?id=13187&ch=infotech.*

* cited by examiner

*Primary Examiner*—Gabriel Garcia
(74) *Attorney, Agent, or Firm*—Friedrich Kueffner

(57) ABSTRACT

A printing system has at least one print head, a refillable or exchangeable ink reservoir or reservoir system, an electronic device for printing, a communication system as a control device for transmitting, blocking, and processing different signals, pulses, information, and data. The communication system is connected to the electronic device for printing and the ink reservoir or the reservoir system.

17 Claims, 1 Drawing Sheet

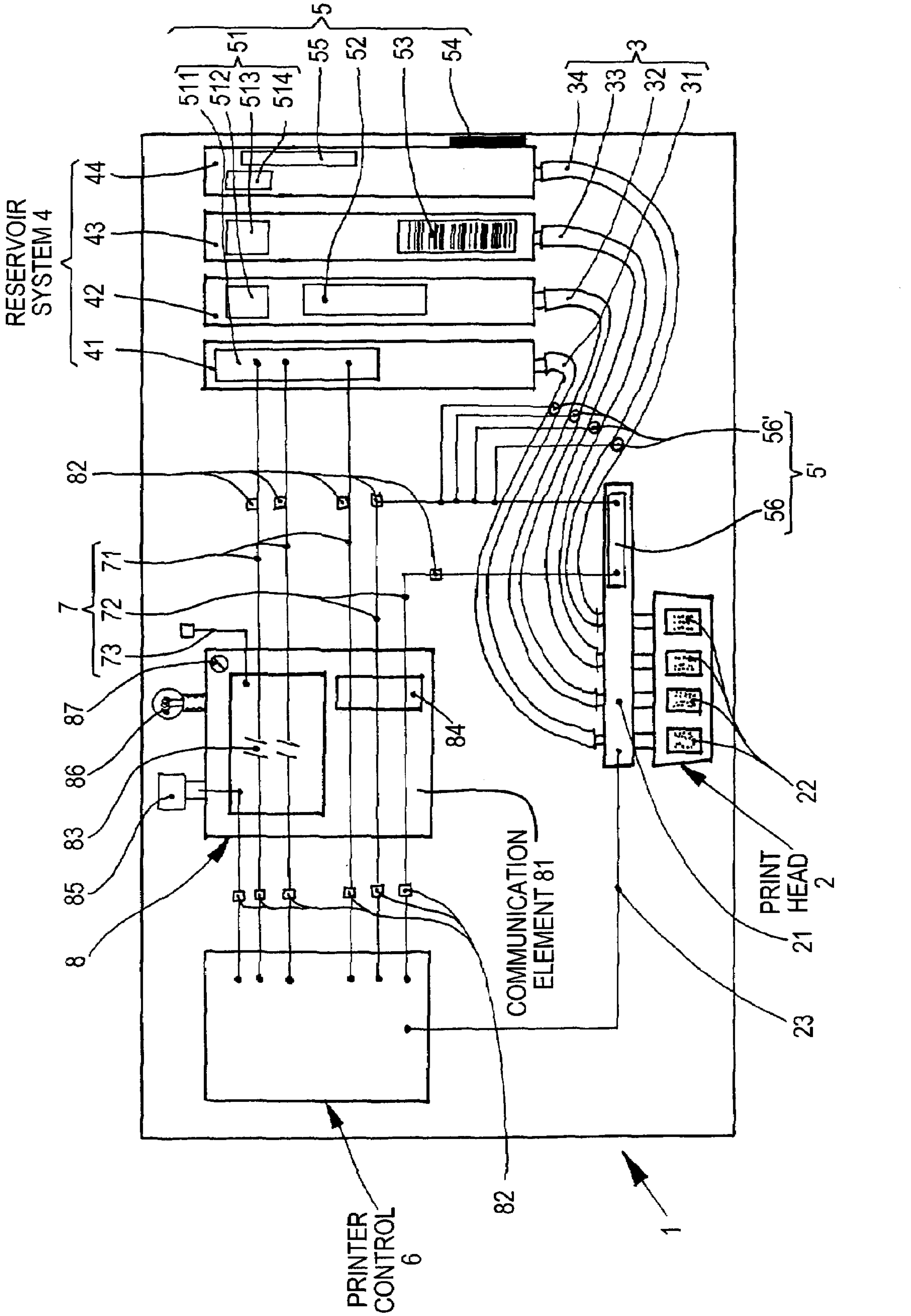
RESERVOIR SYSTEM 4
41
42
43
44
5
51
511
512
513
514
55
52
53
54
3
34
33
32
31
56'
5'
56
82
71
7
72
73
87
86
83
85
8
84
COMMUNICATION ELEMENT 81
PRINT HEAD 2
22
21
23
PRINTER CONTROL 6
82
1

PRINTER OR OTHER AUTOMATIC PRINTING SYSTEM WITH ADDITIONAL CONTROL DEVICE AND CONTROL DEVICE THEREFOR

BACKGROUND OF THE INVENTION

1. Field of the Invention

The invention relates to a printer or other printing system, in particular, for automatic recording, writing or drawing devices or output devices for electronic data processing devices, preferably as an inkjet, drop on demand or continuous jet printer or printing system with at least one control device, a print head, an electronic device for printing, and a refillable and/or exchangeable ink reservoir or reservoir system. The invention further relates to a control device for the printer or printing system.

2. Description of the Related Art

Printers or printing systems comprising at least one print head, an electronic device for printing and further comprising an ink reservoir or reservoir system are already known from German patent application 199 56 702 A1 and European patent application 1 180 912 A1. The exchangeable ink reservoirs are provided with memory chips as coding systems which contains certain basic data such as information in regard to the reservoir type, ink color, manufacturing date, model, and the like which are transmitted to the electronic printing device or received from the electronic printing device and optionally saved in it.

A disadvantage of such a system is that the corresponding memory chip of the ink reservoir is provided, generally only one time, with printing data by the electronic device of the printer and that the electronic device then sends to the memory chip at a certain point in time a locking command in order to interrupt the printing process. A chip which has been written on in this way then makes the ink reservoir useless so that it must be replaced with a new reservoir with a blank chip. A further use by refilling of the empty ink reservoir is not possible because the chip is blocked (usually irreversibly) and sends the signal “cartridge empty” to the printer. Refilling thus does not change this information contents which is stored within the chip and does not release its general locking function.

Also, systems are known in which by means of blocking switches the data lines between the electronic device of the printer and the memory chip of an ink reservoir, if needed, can be switched off in order to stop in this way further data transmission. In this connection, the data transmission lines are practically cut off, completely blocked or even physically cut. A disadvantage of such a system is however that usually all data lines, for example, also for the information of the fill level which are transmitted from the printer to the ink reservoir and vice versa, are completely blocked. This has the result that the fill level in the printer display is frozen at the last information level available at the point before the data line has been blocked and the display remains in this position. This “frozen information” thus does not provide actual fill level data of the ink reservoir and thus also does not provide a warning—actually required—that a low or critical ink level is present in the reservoir.

A solution when using such a system and accepting such an information deficit inherent in this system is achieved only in that the operator has a control possibility of the ink fill level in the reservoir by temporarily removing the reservoir from the printer and by subsequently weighing the reservoir. This process is not only time-consuming but also requires a significant experience and expertise in regard to handling and know-how for determining the actual ink contents. However, this procedure always remains an estimate even when performing all steps with due care. Due to the frequent insertion and removal of the ink reservoir, the corresponding seals and the contacts on the reservoir and possibly also on the printer itself are stressed. This can cause leakage, contact errors and/or transmission failure.

Important is the information in regard to the ink fill level because when the reservoir is empty the correlated print head can possibly be irreversibly damaged. Moreover, in such a case, it cannot be completely excluded that despite the replacement of a defective print head with a new one further problems occur because air can have entered the hose arrangement of the ink supply, and the destruction of the replacement print head is thus preprogrammed. This not only causes a printer or production downtime for several days but in addition costly expenses for service and maintenance.

In general it should be mentioned that ink cartridges or ink reservoirs or other disposable parts which are provided with memory chips are products of a higher price level. Each change, for example, of the ink reservoir requires the user to buy and dispose of a complete ink reservoir, i.e., in addition to the required ink also a housing, an ink bag, valves, electronic devices and so on, even though the hardware elements generally are still usable and could be used multiple times without causing problems.

SUMMARY OF THE INVENTION

It is an object of the present invention to configure printers or other automatic printing systems such as inkjet, drop on demand, or continuous inkjet printers such that the operator in a simple and easy way is enabled to employ even a refilled or other ink reservoirs or optionally other replacement parts.

In accordance with the present invention, this is achieved by correlating a control device as a communication system, preferably for electronic signals, optionally in the form of an additional control device, for transmitting, blocking and/or processing different signals or of pulses, information and/or any other data.

This is furthermore achieved in regard to the control device in that it is embodied as a communication system and has means and/or devices for generating, transmitting, blocking and/or processing signals or impulses, data, and/or other information.

With the solution according to the invention the already present material such as empty reservoirs, hose systems or other disposable parts can be optionally recycled (reused) which protects resources by means of less waste being produced and generally saves the user significant costs.

Such a control device or communication system enables the user, generally electronically, to reinsert into the corresponding printing system and possibly use several times, for example, refilled ink reservoirs or other disposable parts which are provided optionally with a memory chip or with other characterizing markings, codings or data fields.

A special advantage when employing the suggested control device or the communication system resides in the optionally differentiated treatment of different data lines with data and signals being transmitted therewith. The signals can be, in particular, stopped by the communication system, processed, controlled, and/or manipulated so that, for example, an actual and true fill level information of the ink in the ink reservoirs can be passed through and/or visualized which has not been possible in the past with refilled ink reservoirs and cartridges.

BRIEF DESCRIPTION OF THE DRAWING

In the drawing the only FIGURE shows schematically a printer or printing system in which a control device as a communication system is connected in the data line between the electronic device of the printer and the memory chips of the ink reservoirs correlated with the data lines.

DESCRIPTION OF THE PREFERRED EMBODIMENTS

A suggested control device, as a communication system 8, which is configured as a communication element 81 and is connected in the data lines 7 between the electronic device 6 of the printer and the reservoir system 4 will be explained in the following in more detail. The only FIGURE shows a printer or printing system having a control device in the form of a communication system 8 connected in the data line 7 between the electronic device 6 of the printer and the memory chip 51, 511, 512, 513, 514 etc. of the ink reservoirs 41, 42, 43, 44 etc. correlated with these data lines 71. It should be noted that for reasons of simplifying the drawing only a limited date line 7 as a chip line 71 is provided between the electronic device 6 of the printer and the ink reservoir 41 and a further one as a hose connection 72 to the hose system 3 and to the print head slide 21. Other reading devices, sensors, scanners for optical fields 52, EAN coding 52, fill level meters 54, reservoir identifications 55 and so on and/or other control devices are, of course, connected or connectable, optionally by data lines 7, with the electronic device 6 of the printer insofar as the data transfer is not generally and optionally entirely carried out by infrared, ultrasound, laser optic, radio transmission or other "wireless" transmission systems.

Data lines extend, for example, as chip lines 71, via the control device configured as a compact communication element 81 from the electronic device 6 of the printer to the reservoir system 4. The data lines referred to as hose lines 72 connect the electronic device 6 of the printer with a memory chip illustrated as a hose identification 56 of the hose system 3 on the print head slide 21 and optionally with the hose identifications 56' correlated with the hoses 31, 32, 33, 34 etc. These memory chips, i.e., these hose identifications 56, 56', can be arranged at any other location of the hose system 3, for example, in its connecting area on or to the reservoir system 5. An energy line 73 may also be present for internal or external supply of electricity to various components.

The illustrated communication element 81 is comprised of, preferably several, signal bodies 86 as indicating elements, such as, for example, each line having an LED illuminating element for visualizing actual operational states within the printing system 1, one or several pulse transponders 85 such as sensors or switches in order to manually or automatically start pulses for desired actions or for performing readjustments or other "reset functions", manually or automatically. Moreover, the communication system 8 or the communication element 81 have, as important parts, an electronic connecting device 83 and a memory element 84 for a corresponding treatment and optionally for saving in a memory element the data which concern the reservoir system 4, the hose system 3 and/or other optionally monitored disposable parts. The electronic connecting device 83 and the memory element 84 are preferably overall a "microcontroller" which is programmable and into which data can be written, optionally with a writing/reading function which can be adjusted or preprogrammed initially at the manufacturer but can also be programmed by the user individually by means of a personal computer or laptop and which optionally also is programmable automatically by the printer and, if needed, is adjusted to the actual functional states and operating parameters. Inasmuch as an electric current supply of the controller is required, this can be realized to be performed externally or by its own energy sources or, as is generally the case, by the internal printer data line 7 which can also contain energy supply lines 73 for supplying electricity to various components.

As an example, the illustration shows that data lines 7 are present via which the data in some form are passed through, interrupted, blocked, simulated and/or manipulated. Such data lines 7 can be chip lines 71 between the printer control 6 and the memory chips 51, 511, 512, 513, 514 etc. from the reservoir 41 or from the other reservoirs 42, 43, 44, ff. or a hose line 72 to the hose system 3 and/or to the print head slide 21 or energy lines 73 and/or other lines. The hose system 3 with its own individual ink hoses 31, 32, 33, 34, ff. connects the print head 2 or the print head slide 21 and the print jets 22 with correlated ink reservoirs 41, 42, 43, 44 etc.

When the printing action is performed, the electronic device 6 for printing sends the required control data, for example, via a printing data line 23, to the print head 2 for an appropriate activation of the relevant print jets 22 and for ink dispensing through them. A memory chip of the hose system 3 is provided as a hose identification 56, 56' and connected via data lines, referenced as hose lines 72, with the electronic device 6 of the printer. Each one of the data lines 7, 71, 72, ff. can have a certain data passage direction and, depending on the requirements, can transmit and/or block or allow unhindered and unaltered passage of signals or pulses or data in one direction, in the other direction, or in both directions.

When a communication system 8 or a communication element 81 is connected to the data line 7 ff. and a refilled ink reservoir 41, 42, 43, 44, ff. is inserted into this print system 1, the user, optionally before insertion, can transmit by pushing the reset key 85, or also by other pulses, certain preset data in regard to the fill level of a new ink reservoir or a partially empty ink reservoir 41, 42, 43, 44 ff. to the electronic device 6 of the printer. The electronic device 6 then optionally resets the circuit to 100%, i.e., completely filled, and the printing action can be started.

During this printing process signals or data are usually transmitted from the electronic device 6 to the memory chips 51, 511, 512, 513, 514, ff., 56, 56' ff. and/or retrieved therefrom. With the communication system 8 inserted, this system takes over the chip functions and communicates, in place of the memory chips, generally exclusively with the electronic device 6 of the printer. All signals S-1, S-2, S-3, S-4, S-5 S-6 ff. are transmitted by the electronic device 6 of the printer to the communication system 8 but, contrary to the usual procedure, are not transmitted from there to the memory chips 51, 511, 512, 513, 514 ff. Instead of the memory chips 51, 511, 512, 513, 514, ff., the communication system 8 transmits to the electronic device 6 of the printer all data required for the further printing action The user does not recognize any difference in regard to the printing action with a communication system 8 or with the inserted communication element 81 in comparison to a printing system without such communication element 81. The printer 1 operates properly and without disruptions.

Instead of the memory chips 51, 511, 512, 513, 514, ff. in the context of the coding system 5 optical fields 52, EAN codings 53, mechanical, optical or other systems for the fill level measurement 54 or other coding devices can also be employed when the corresponding reading and/or writing devices for this purpose are present and the electronic device 6 of the printer is responsive to them. The communication system 8 must then be optionally adjusted accordingly.

The replacement and/or refilling of empty or partially empty ink reservoirs 41, 42, 43, 44, ff. can be realized by using the suggested control devices and communication systems 8 or communication elements 81 in the case of printers as they are described, for example, in German patent application 199 12 620 or German patent application 101 16 429 but also in other printing systems with comparable construction, technology, and electronic device.

Preferably before inserting new or refilled ink reservoirs 41, 42, 43, 44, ff. into the printer, the already described resetting action of the preset data which are stored in the communication system 8 or in the communication element 81 is carried out. The communication system 8 or the communication element 81 simulates to the printer in operation and/or before beginning the printing action optionally the presence of a new and completely filled original ink reservoir or of a functional, partially empty reservoir, and the printer or its electronic device 6 then allows incoming print jobs to be carried out and performs them even though possibly a used and/or user-refilled ink reservoir is employed whose memory chip 51, 511, 512, 513, 514, ff. is missing or already written on such that the message "cartridge missing", "cartridge empty", "spent" or "cartridge defective" would be transmitted if the communication system 8 were not directly connected with the electronic device 6 and were not communicating with it.

The "error message" however does not reach the electronic device 6 of the printer as a result of the interposed communication system 8. Instead, the communication system 8 transmits the required, optionally internally saved, working data from its own data base to the electronic device 6.

In the following some information and tasks of the memory chip(s) 51, 511, 512, 513, 514, ff., 56, 56' are described which during printing are supplied constantly with data in order to recognize when a certain critical ink level is no longer present. When this ink level is no longer present, information is written on the chip 51, 511, 512, 513, 514, ff. which makes the cartridge 41 etc. unusable. Any printing action is then automatically interrupted, optionally, directly before the state "reservoir empty".

The data lines 7, 71, 72, used between the electronic device 6 and the memory chips 51, 511, 512, 513, 514, ff., 56 as in the prior art, transmit signals, pulses, data and/or information of different types which in this specification are uniformly referred to as "signals".

Examples of signals as they are known from the prior art are explained in the following.

Signal "S-1": signal for "type of hose", for identification of the hose system 3 which forms the ink supply from the reservoir system 3 to the print head 2. An identification is expedient because optionally an accidental switching of individual hoses or hose system, for example, of pigment-type inks and/or dye-type inks must be prevented. Also, information in regard to defective hoses can be transmitted. The information flow direction is conventionally from the hose system 3 to the electronic device 6 of the printer.

Signal "S-2": signal "hose-time" for data compilation of the operating period of the hose system. This signal generally is transmitted in a data transfer in both directions through the hose lines 72, from the electronic device 6 to the chip 56, 56' on the hose system 3,21.

Signal "S-3": signal for "type of reservoir" for identification of the type of the ink reservoir 41, 42, 43, 44, ff., for example, of the kind of the reservoir, the manufacturing date, the batch number and/or the color of the ink. These data flow via the chip line 71 from the reservoir system 3 to the electronic device 6 of the printer.

Signal "S-4": "preset fill level signal" for computing the fill level in the ink reservoirs 41, 42, 43, 44, ff. In this connection, the electronic device 6 of the printer calculates the used amount of ink based on the number of generated ink droplets and their volume. The information flow takes place via the chip line 71 from the electronic device 6 of the printer to the chips 51, ff. of the ink reservoirs 41, 42, 43, 44, ff. and is stored therein.

Signal "S-5": "actual fill level signal", for example, for or based on the fill level measurement of the actual ink level in the ink reservoir 41, 42, 43, 44, ff. A critical ink level can already be present, for example, at 34% residual volume. This signal and the corresponding data are retrieved via the chip line 71 from the electronic device 6 of the printer and are processed and taken into consideration.

In the following it is illustrated how, for example, these signals S-1 to S-5 are "treated" by the communication element 8, that is, allowed to pass through, blocked, simulated and/or manipulated.

Signal "S-1"="passing through": The signal for "type of hose" serves for identification of the hose system 3 which forms the ink supply line from the reservoir system 4 to the print head 2, and the signal "S-2"="passing through", signal "hose-time", serves for data compilation of the operating time of the hose system 3. These two signals are conventionally only "passed through" the communication system 8, i.e., they pass through without filtration because in general they are required or important with respect to the ink correlation as well as for safety reasons. The signals S-1 and S-2 are therefore not blocked. The data and information in regard to the hose system 3, about its types, the age or operating hours are therefore conventionally directly transferred. The communication element 8 therefore only passes on this information as well as the information in regard to a hose system that has been newly installed in the printer or another hose system inserted into the printer 1, for example, when changing from pigment-type ink to solvent-type ink or from aqueous ink to, for example, alcohol-based ink. Signal 3="simulated": signal for "type of reservoir" for identification of the type of the ink reservoir 41, 42, 44, 44, ff. is simulated by the communication system 8 because the information or data relating to the identification of the employed ink reservoir 41, 42, 44, 43 44, ff is optionally required for the function of the printer 1 and the printer would not print without such identification data. These data are therefore stored within the communication element 81 and are therefore transmitted as simulated information by it instead of the "real chip data" to the electronic device 6.

Signal 4="manipulated": The "preset fill level signal" for determining the fill level in the ink reservoirs 41, 42, 43, 44, ff. can be manipulated or "blocked" as needed. Since only the information in regard to the actual and true fill level is important and not the amount of ink used by the printer or the number of printer droplets, these data are intercepted in the communication element 81 and blocked and optionally stored and made available if needed. Instead, adequate (manipulated) information in regard to the fill level is transmitted as needed to the electronic device 6 of the printer. A data or information exchange in regard to optionally spent ink volume is carried out thus only between the electronic device 6 and the communication system 8 but not between the electronic device 6 and chip 51 or the ink reservoirs 41, 42, 43, 44, ff. In this way it is prevented that the electronic device 6 will send a blocking command to the chip 51, ff., the ink reservoir 41, ff. In this way it is possible that in the printer ink reservoirs 41, 42, 43, 44 ff. can be used which have been printed to the empty state prior to their current use and accordingly would be unsuitable because the information "unusable" or "broken" has been written into the chips 51, 511, 512, 513, 514, ff. of the reservoirs 5 but does not reach the electronic device 6.

Signal S-5="passed through": The "actual fill level signal" for measuring the true and actual fill level of the real ink level in the ink reservoir 41, 42, 43, 44, ff., in contrast, is optionally only passed through because expediently real-time conditions should be worked with. This is a further example for unblocked data. The actual fill level measurement, for example, measuring the float level in the ink reservoir, is generally very important because it must be prevented in any case that the system will be printed to an empty state. The data for the actual fill level are retrieved usually by the electronic device 6, entered and processed. In this way, it is ensured that in the case of an incompletely filled ink reservoir the fill level indicator is corrected and at critical ink levels the electronic device 6 will stop the printing actions in order to prevent that air will real reach the hose system 3 or even the print head 2 or that the printhead will overheat.

In the case that the printer 1, with the communication element 81 inserted therein, receives directly from the reservoir system 5 the message that the fill level has reached a critical state, the printer is switched off. When in this situation the empty ink reservoir 41, 42, 43, 44, ff. is to be refilled, it is removed in the conventional way from the printer 1 by the user and is refilled outside of the printer 1. On the communication element 81 the control light 86 correlated with the reservoir is illuminated or flashes. By pressing on the key 85 for the like which is arranged in the housing of the communication element 81 a "reset" can be performed which sends a message to the electronic device 6 of the printer that a filled, operational ink reservoir 41, 42, 43, 44, ff. of the corresponding color is present in the printer 1. At the same time, the droplets counter for computing the amount of spent ink is reset to zero. Subsequently, the refilled reservoir can be inserted. With it, it is possible to print normally in the same way as with an original or new reservoir and with a memory chip 51, 511, 512, 513, 514, ff. on no printing data have been written on yet.

When the communication element 81 is mounted in the printer 1 and connected to the data line 7, it will read the actual ink levels of all ink reservoirs 41, 42, 43, 44, ff. in the printer from the memory chips 51, 511, 512, 513, 514, ff. and enters them as base or initial values in a storage device 84. These data are then used for further communication.

When the communication element 81 is mounted in the printer 1 at a point in time when already partially empty ink reservoirs are mounted in the printer 1, the data of the partially empty reservoirs are employed. When at the time of mounting new reservoirs 41, 42, 43, 44, ff. are present within the printer 1, their data are then used by the communication element.

When the memory 84 of the communication element 81 is using the data of 100% filled ink reservoirs 41, 42, 43, 44, ff. as reference data, and the system is reset by the "reset" function, in this case the individual ink reservoirs must be refilled before the system is operated in order to prevent that the electronic device 6 has at its disposal data according to which there is still a sufficient amount of ink supply even though a reservoir 41, 42, 43, 44, ff. is already empty.

As needed, it may be especially advantageous that the communication element 81 is already implemented within the printer system 1 before the chips 51, 511, 512, 513, 514, ff. optionally present on the ink reservoirs 41, 42, 43, 44, ff. are written on by the electronic device 6. In this way, ink reservoirs 41, 42, 43, 44, ff. which have been frequently refilled but are still "blank", are identified or recognized by the electronic device 6 as new and unused and can be used (one time) in the normal way even after removal of the communication element 81 or with system-identical printers without communication system 8.

It is a special advantage when the communication system 8 and the electronic device 83, 84 arranged therein is configured together with the software such that it can be adapted by reprogramming without problems also to other printer models.

The minimal dimensions of the housing in which the electronic device of the communication element 81 is mounted enables mounting in or on the printer housing. Mounting can be carried out by the user without tools and auxiliary means, for example, by means of plug connections as connecting systems 82. Usually, no changes or modifications are required on the printer 1 for the mounting. A change back to the original state or a removal of the communication element 81 is possible without problems and does not leave behind any modification features.

For the operation of the communication system 8 or of the communication element 81 generally no external energy supply is required because the usually present energy systems, possibly via energy lines 73, can be used and are sufficient.

The present intention thus concerns a printer or other printing system, in particular, for automatic recording, writing or drawing devices or output device for electronic data processing devices, preferably as an inkjet, drop on demand, or continuous jet printer or printing system, comprising at least one print head 2, a refillable and/or exchangeable ink reservoir or ink system 4, an electronic device 6 for printing, and also optionally a control device wherein, in or on the printer 1, a communication system 8 is arranged as a control device, optionally as an additional control device, for transmitting, blocking and/or for processing different signals S-1, S-2, S-3, S-4, S-5, S-6 ff. or pulses, information and/or any other data.

The communication system 8 and/or its connecting system 82 are to be arranged preferably between the electronic device 6 of the printer and an ink reservoir 41, 42, 43, 44 or the reservoir system 4 wherein a connecting system 82 of the communication system 8 can have releasable plug or screw connections and can be arranged within the data lines 7, 71 arranged between the electronic device 6 and the reservoir or reservoir system 4. Moreover, the connecting system 82 of the communication system 8 and its detachable connections should be arranged within a hose system 3 between the electronic device 6 and a memory chip 51, 511, 512, 513, 514 of the reservoir system 4 and/or within the hose system 3 between the print head 2 and the ink reservoir or reservoir system 4 or its data lines 7,72.

For a proper function the communication system 8 should have means and devices for passing through, affecting, generating and/or a locking different signals, pulses, information and/or data which flows between the ink reservoir or the reservoir system 4 and/or the hose system 3 and the electronic device 6. In this way, the communication system 8 should act relative to the electronic device 6 and/or a coding system 5, 5' of an ink reservoir or ink system 4 and/or a hose system 3 permanently or as needed as activator, simulator, blocking device and/or manipulator for or of the signal(s), pulses, data and/or other information.

According to the invention the communication system 8 can also be realized in the form of an control device 1 for a printer, optionally an additional control device, which has means and/or devices for generating, transmitting, blocking and/or processing signals S-1, S-2, S-3, S-4, S-5, S-6, ff. or of pulses, data and/or other information and which is provided with, preferably easily detachable, connectors 82, with at least one connecting electronic device 83, with at least one memory element 84, with at least one or several pulse transducers or reset keys 85, with signal bodies 86 and/or with further means and/or devices with which it can transmit, block and/or process signals S-1, S-2, S-3, S-4, S-5, S-6, ff., data, impulses and/or information. Advantageously, such a control device or a communication system 8 can be configured as a detachable and exchangeable component which is configured as a mobile easily exchangeable communication element 81 and has releasable connectors 82 as well as loop and hook fasteners, adhesive straps, screws, pins and/or other fastening means 87 with which it can be connected or inserted, as needed, in a detachable way to or into the printer.

The control device should also be able optionally to store signals S-1, S-2, S-3, S-4, S-5, S-6, ff., pulses, data and/or information which, as needed, can signal or simulate a new, i.e., unused, ink reservoir 4, an unused hose package 3 and/or other unused replacement parts. Such signals S-1, S-2, S-3, S-4, S-5, S-6, ff. or pulses or data and/or information should be activatable and/or retrievable manually and preferably also automatically.

It is especially advantageous when the control device is a connecting electronic device 83 and/or embodied as a storage element 84 of a writable and/or programmable "micro-controller", optionally with reading/writing function which can be adjusted, preprogrammed, individually programmed and/or programmed by the printer, and, if needed, can be adjusted to the actual functional state and operating parameter of the printer 1.

When the control device also contains information or data for identification of the employed ink reservoir 4 or data of a coding system 5 or of memory chips 51, 511, 512, 513, 514, ff. and, as needed, can release them for identification of the employed ink reservoir(s) 4, 41, 42, 43, 44, ff. and/or of the employed hose system 3 or its coding 5' relative to the employed hose system and/or the employed ink reservoirs 4, 41, 42, 43, 44, ff. which are identical as input and output information, it is possible in this way to simulate specially and/or particularly treated components. In this way, it is possible to employ components that are not entirely in "conformity with the system".

While specific embodiments of the invention have been shown and described in detail to illustrate the inventive principles, it will be understood that the invention may be embodied otherwise without departing from such principles.

What is claimed is:

1. A printing system comprising at least one print head, a refillable or exchangeable ink reservoir or reservoir system, a memory element in the form of a chip fastened to the reservoir system, an electronic device for printing, a communication system as a control device configured to perform at least one action selected from the group consisting of transmitting, blocking, and processing of different signals, the control device being arranged between the electronic device for printing and the reservoir or reservoir system, the communications system having a memory element for storing data relating to the reservoir and/or a hose system extending between the electronic device and a memory chip of the reservoir system and extending between the print head and the ink reservoir or reservoir system, the communication system including means and devices for blocking at least one signal, pulse, information and/or data flowing between the ink reservoir or reservoir system and/or the hose system and the electronic device for printing.

2. The printing system according to claim 1, wherein the communication system comprises a connector system connecting the communication system to the electronic device for printing and the ink reservoir or the reservoir system, further comprising data lines connecting the electronic device to the ink reservoir or the reservoir system wherein the connector system comprises releasable plug or screw connections and is connected to the data lines.

3. The printing system according to claim 2, wherein the connector system has releasable connectors and is connected to the hose system or the data lines of the hose system.

4. The printing system according to claim 1, wherein the communication system has means for carrying out at least one action selected from the group consisting of passing through, setting up and affecting at least one of different signals, pulses, information, and data flowing between the ink reservoir or the reservoir system and the hose system and the electronic device for printing.

5. The printing system according to claim 1, wherein the communication system has means for acting relative to at least one of the electronic device for printing, a coding system of the ink reservoir or the reservoir system, and the hose system connected to the ink reservoir or the reservoir system, permanently or as needed as at least one of an activator, a simulator, a blocking device, and a manipulator of signals, pulses, data, and information.

6. The printing system according to claim 1, embodied as an inkjet system, a drop on demand system, or a continuous jet system.

7. A control device for a printing system according to claim 1, the control device configured as a communication system for transmitting, blocking and/or processing different signals, the communications system having a memory element for storing data relating to the reservoir and/or a hose system extending between the electronic device and a memory chip of the reservoir system and extending between the print head and the ink reservoir or reservoir system, the communication system including means and devices for blocking at least one signal, pulse, information and/or data flowing between the ink reservoir or reservoir system and/or the hose system and the electronic device for printing.

8. The control device according to claim 7, wherein the communication system is a communication element and comprises connectors, a connecting electronic device, a memory element, one or several pulse transducers or reset switches, and signal bodies, whereby signals or pulses, data and/or information can be transmitted, blocked and/or processed.

9. The control device according to claim 8, wherein the communication element is a detachable and easily exchangeable component.

10. The control device according to claim 9, wherein the communication system is a communication element that is mobile and easily exchangeable and comprises releasable connectors and additional fastening means.

11. The control device according to claim 8, wherein data representing signals or pulses that vary over time, data and information are saved in the memory element, wherein the data representing signals or pulses, data and information saved in the memory element signal or simulate at least one of a new unused ink reservoir, an unused hose system, and unused replacement parts.

12. The control device according to claim 11, comprising means for activating and retrieving manually or automatically signals, pulses, data and information saved in the memory.

13. The control device according to claim 8, comprising a microcontroller that is at least one of writable and programmable and is at least one of the connecting electronic device and the memory element.

14. The control device according to claim 13, wherein the microcontroller has a writing/reading function and is configured to be at least one of adjustable, preprogrammable, individually programmable, programmable by the printer, and settable to actual functional states and operational parameters.

15. The control device according to claim 7, having saved therein identification data for identifying the ink reservoirs inserted into the printing system.

16. The control device according to claim 7, containing information or data of a coding system or of memory chips for identification of at least one of the ink reservoirs and the hose system.

17. The control device according to claim 16, wherein the information or data of the coding of the hose system and of the ink reservoirs are identical as input and output information or data.

* * * * *